D. J. Cooper,
Truss.
No. 95,433.  Patented Oct. 5, 1869.
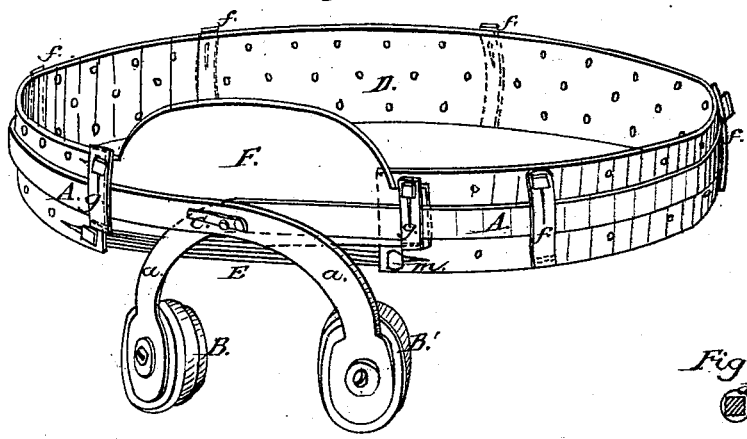
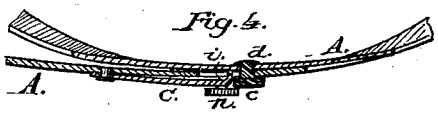
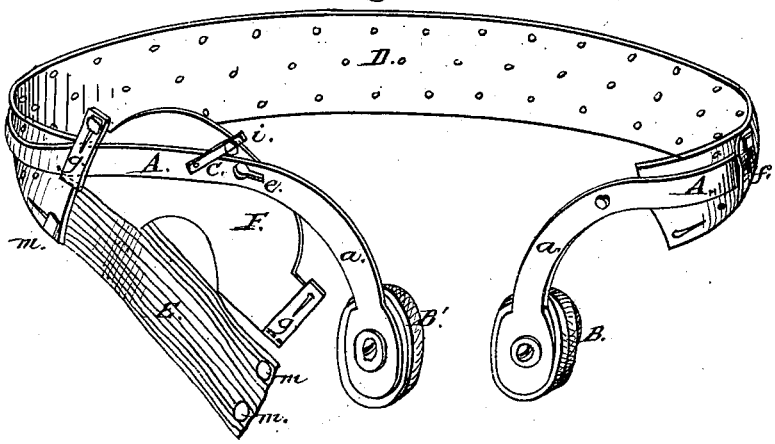
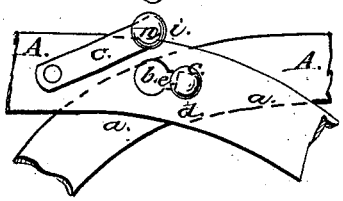
WITNESSES:
Geo. W. Pearson
Benjamin N. Meads
INVENTOR:
David J. Cooper
per
Opperman & Johnson,
Attorneys.

United States Patent Office.

DAVID J. COOPER, OF NEW ORLEANS, LOUISIANA.

Letters Patent No. 95,433, dated October 5, 1869.

IMPROVED HERNIA-TRUSS.

The Schedule referred to in these Letters Patent and making part of the same.

*To all whom it may concern:*

Be it known that I, DAVID J. COOPER, M. D., of New Orleans, in the parish of Orleans, and State of Louisiana, have invented certain new and useful Improvements in Hernia-Trusses; and I do hereby declare that the following is a full, clear, and exact description of the same, reference being had to the accompanying drawings, which make part of this specification, and in which—

Figure 1 represents a view, in perspective, of a spring-truss, with its ends crossed and locked, and having its several parts in the position they occupy when in use;

Figure 2 represents a similar view, showing the ends of the springs unlocked and separated;

Figure 3 represents a portion of the crossed ends of the spring, showing the spring-arm unlocked, and the ends of the spring-truss ready to be separated;

Figure 4 represents a horizontal section, showing the crossed ends of the spring locked by the spring-arm; and Figure 5 represents the square shank of the locking-pin.

I am aware that a spring-truss has been made of two pieces of steel, with their front ends curved, crossing each other, and permanently riveted together, so that the said crossed ends cannot be separated, while their rear ends are disconnected and provided with back-pads. I am also aware that a spring-truss has been made in two parts, hinged at the back, with a pad, and crossed at their front ends, but not connected together. These two differently-constructed springs have many disadvantages, which have hitherto prevented the introduction of a crossed spring-truss into use, because, in the one case, a joint unites the two parts at the back, while their front ends being disconnected, completely destroys the continuity of the spring, and thus interrupts the constant and uniform pressure which is so necessary in hernia; besides, the pad which protects the said hinged joint is more a detriment than an advantage to the wearer; while, in the other case, the curved crossed ends of the spring being permanently riveted together, while their rear ends are open, and provided with back-pads, produce exactly the same effect, and the constant and equal pressure of the spring is lost in both cases, and thus renders the advantages of a spring, having its front ends crossed, completely nugatory.

It is the object of my improvements to remedy these defects; and they consist in crossing the front ends of a continuous spring-truss, and locking them together by a fastening which will admit of their easy and ready separation, thereby obtaining all the advantages of a spring having its ends crossed in front, and capable of ready separation, while its continuity is uninterrupted, so that the pressure of each pad upon the body will be equal and constant.

In the accompanying drawings—

The spring A is made in one piece, of the required form, the front ends, *a*, of which are curved sharply, and cross each other in a line parallel with the horizontal portion of the spring, and to their ends the convex and concave pads B B' are secured.

These pads are of such construction, and secured in such manner as is described in an application for a patent for improvements in hernia-trusses, bearing even date herewith, and need not, therefore, be more fully described in this patent.

At the junction of the ends of the spring A, I make an opening, *b*, in the overlapping end, larger at one end than at the other, and on the other end of the spring I secure a locking-pin, *c*, the head of which is slightly less in diameter than the larger circular part of the opening *b* in the overlapping end, while the shank *d* thereof is of a size slightly less than the smallest portion, *e*, figs. 2 and 3, of said opening, *b*, so that when the head of the locking-pin *c* is inserted in the opening, *b*, the shank *d* will thereby be enabled to be passed into the smallest portion *e* of said opening, so that the head of the locking-pin shall overlap its sides, as shown in fig. 3.

This would not, however, form a sufficient lock to the junction of the parts, in order to more fully effect which, I pivot an arm, C, to the outer side of the overlapping end of the spring A, of a sufficient length, that when turned down in a line parallel to the horizontal direction of the spring, as shown in figs. 1 and 4, its end will abut against the head of the locking-pin *c*, and thus lock its shank *d* in the smaller part *e* of the opening; and in order to maintain the said pivoted catch in its locked position, it is provided with a lip or tooth, *i*, figs. 2 and 4, on the inner side of its loose end, so that when passed over the outer side of the spring, it will fit into the larger portion *b* of the opening therein, and thus, by its elasticity, lock itself in its position, so that it cannot fall out of the opening, and when required to be unlocked, must be drawn outward by a slight pull, for which purpose its end is provided with a small knob, *n*.

It will be observed that the parts, thus locked together, would be liable to turn upon the shank of the locking-pin *c*, so as to bring the pads B B' nearer to or further from each other, by the action of the hips in walking, which would be not only injurious, in producing abrasion of the body, but would tend to withdraw the pads from the rupture, instead of holding them thereto, which, it is well understood, would be fatal to any truss, the pads of which have such movement, as is the case of a truss having its ends connected by rivet, or disconnected entirely.

To avoid this defect, I make the shank $d$ of the locking-pin $c$ square, as shown in fig. 5, so that it fits closely between the parallel sides, and against the square end of the parallel portion $e$ of the opening $b$, so that the overlapping portion of the spring cannot turn on the shank, neither can the shank of the locking-pin turn in the opening within which it is locked, thereby maintaining the pads always the same distance apart, and making a firm junction of the parts, whilst great facility it afforded for their separation, by simply removing the toothed end of the pivoted catch from its locked position within the opening.

In order to prevent the spring A from cutting into the body, I use, in connection therewith, a perforated supporting and protecting-strap, D, secured to the inner side thereof by loops $f$, so that its ends shall terminate at or near the junction of the spring, and be connected by an elastic band, E, by means of buttons $m$, to allow it to expand and contract with the tissue of the body.

This supporting and protecting-strap is of a width greater than that of the spring, so that the latter may be made narrower than heretofore, while the strap has all the advantages of a wide spring.

The supporting-strap also prevents the necessity of covering the steel spring with chamois-skin, which lessens considerably the expense of the spring-truss, as ordinarily constructed, while the steel spring itself may be protected from rust or corrosion by being coated with varnish or paint suitable for the purpose.

Another serious disadvantage in the use of springs having their front ends crossed, as heretofore constructed, is the tendency to press into the abdomen, particularly when the body is in a bending posture, to prevent which, I secure a guard or shield, F, of semicircular form, made of leather or other suitable material, and secure it to the spring by button-loops $g$, on each side of the junction thereof, so as to rise above the spring, and thus shield the curved edges thereof from pressing into the body.

Having thus described my invention,

I claim—

1. A continuous spring of a hernia-truss, having its ends crossed and locked by a fastening, in such manner as to prevent pivotal motion of the joint, and readily admit of the separation of the parts, while at the same time maintaining the pads at equal and uniform distances apart, substantially as before described.

2. The enlarged opening $b$ in the overlapping end of the spring A, in combination with the locking-pin $c$ and pivoted spring-toothed locking-arm C, substantially as before described.

DAVID J. COOPER, M. D.

Witnesses:
  D. H. COOPER,
  A. E. H. JOHNSON.